(12) United States Patent
Kawabe et al.

(10) Patent No.: US 10,921,814 B2
(45) Date of Patent: Feb. 16, 2021

(54) VEHICLE CONTROL SYSTEM AND METHOD, AND TRAVEL ASSIST SERVER

(71) Applicant: HONDA MOTOR CO., LTD., Tokyo (JP)

(72) Inventors: Koji Kawabe, Wako (JP); Kunimichi Hatano, Wako (JP); Naoki Hayashibe, Wako (JP); Mitsunori Kawashima, Wako (JP); Takashi Sugawara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 320 days.

(21) Appl. No.: 15/993,787

(22) Filed: May 31, 2018

(65) Prior Publication Data

US 2018/0348777 A1 Dec. 6, 2018

(30) Foreign Application Priority Data

Jun. 2, 2017 (JP) .................................. 2017-110354

(51) Int. Cl.
*G05D 1/02* (2020.01)
*B60W 30/14* (2006.01)
(Continued)

(52) U.S. Cl.
CPC ........... *G05D 1/0223* (2013.01); *B60W 30/18* (2013.01); *G05D 1/0088* (2013.01);
(Continued)

(58) Field of Classification Search
CPC ...... B60W 30/10; B60W 30/14; B60W 30/18; B60W 2050/0088; B60W 2554/00; B60W 2554/4026; B60W 2554/4029; B60W 2554/4045; B60W 2554/80; B60W 2556/65
See application file for complete search history.

(56) References Cited

U.S. PATENT DOCUMENTS

2002/0035422 A1 3/2002 Sasaki
2017/0213457 A1\* 7/2017 Sato ......................... G08G 1/09
(Continued)

FOREIGN PATENT DOCUMENTS

DE 102013205392 10/2014
EP 3151213 4/2017
(Continued)

OTHER PUBLICATIONS

Japanese Office Action for Japanese Patent Application No. 2019-085033 dated Apr. 7, 2020.
(Continued)

*Primary Examiner* — Dale Moyer
(74) *Attorney, Agent, or Firm* — Amin, Turocy & Watson, LLP

(57) ABSTRACT

When a transmission condition regarding a state detected by a state detection unit (vehicle sensor, operation detection sensor, external environment sensor, or internal environment sensor) is satisfied while a travel controller performs a travel control, a vehicle control system transmits attentional state information representing a travel state, an operation state, or an environment state to a travel assist server through a communication device.

14 Claims, 12 Drawing Sheets

(51) Int. Cl.
*B60W 30/18* (2012.01)
*G05D 1/00* (2006.01)
*B60W 20/00* (2016.01)

(52) U.S. Cl.
CPC ....... *G05D 1/0276* (2013.01); *B60W 2554/00* (2020.02); *B60W 2554/80* (2020.02); *B60W 2556/65* (2020.02)

(56) References Cited

U.S. PATENT DOCUMENTS

| | | | |
|---|---|---|---|
| 2018/0074493 A1* | 3/2018 | Prokhorov | G08G 1/096811 |
| 2018/0170372 A1 | 6/2018 | Takamatsu et al. | |
| 2018/0170374 A1 | 6/2018 | Otsuka et al. | |
| 2018/0281811 A1* | 10/2018 | Tochioka | B60W 50/12 |
| 2020/0122724 A1* | 4/2020 | Hiramatsu | B60W 50/10 |

FOREIGN PATENT DOCUMENTS

| | | |
|---|---|---|
| JP | 2002-042288 | 2/2002 |
| JP | 2007-334554 | 12/2007 |
| JP | 2012-051566 | 3/2012 |
| JP | 2012-059058 | 3/2012 |
| JP | 2017-047694 | 3/2017 |
| JP | 2018-142921 | 9/2018 |
| WO | 2017-038166 | 3/2017 |

OTHER PUBLICATIONS

German Office Action and Search Report for German Patent Application No. 102018208598.6 dated Apr. 9, 2020.

\* cited by examiner

FIG. 4

| NUMBER | INDIVIDUAL CONDITION | DETERMINATION VALUE |
|---|---|---|
| CONDITION 1 | WHEN SHOCK IS APPLIED TO HOST VEHICLE (CONTACT WITH OBJECT/OCCURRENCE OF SUDDEN BRAKE) | DETECTION VALUE OF ACCELERATION SENSOR |
| CONDITION 2 | WHEN TAKEOVER HAS OCCURRED | DETECTION VALUE OF STEERING HOLDING SENSOR |
| CONDITION 3 | WHEN PERFORMANCE HAS DETERIORATED | STATE VALUE EXPRESSING ABNORMALITY OR TROUBLE |
| CONDITION 4 | WHEN TRAVEL INFLUENCE IS RECOGNIZED | INFLUENCE LEVEL (SCENE) |
| CONDITION 5 | | INFLUENCE LEVEL (ACTION PATTERN) |
| CONDITION 6 | | WHETHER OBJECT HAS INTERRUPTED |

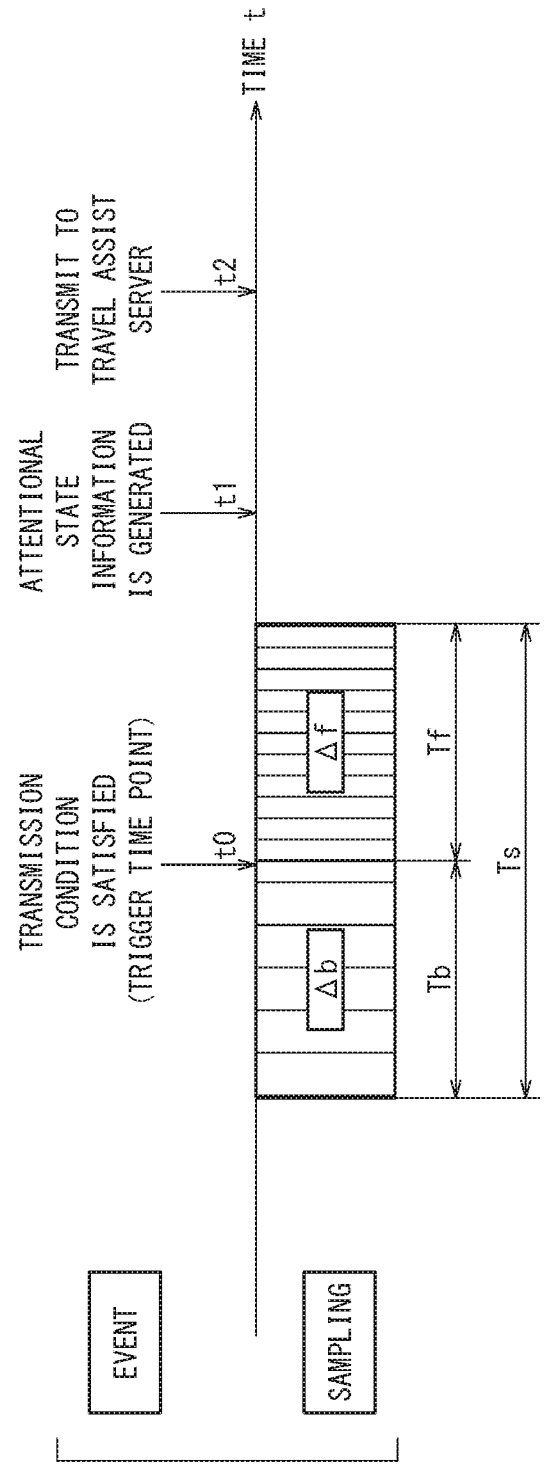

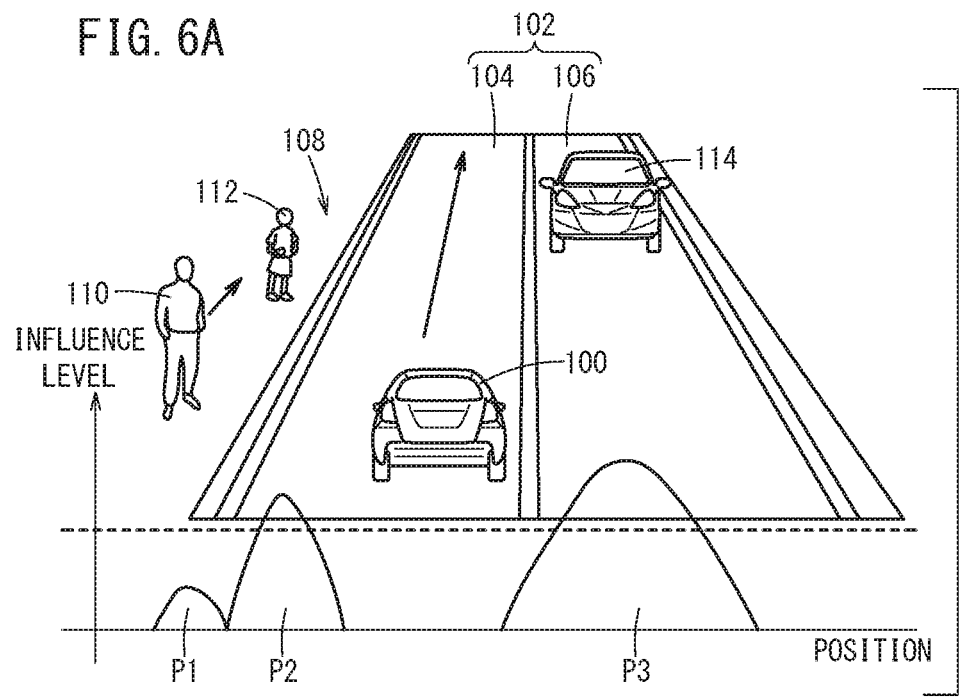
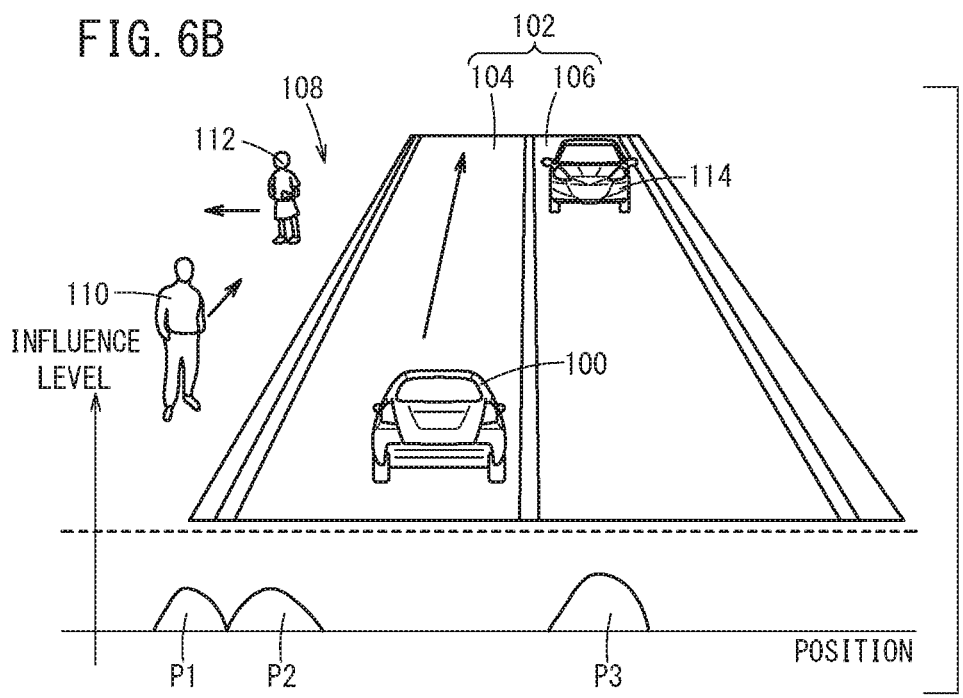

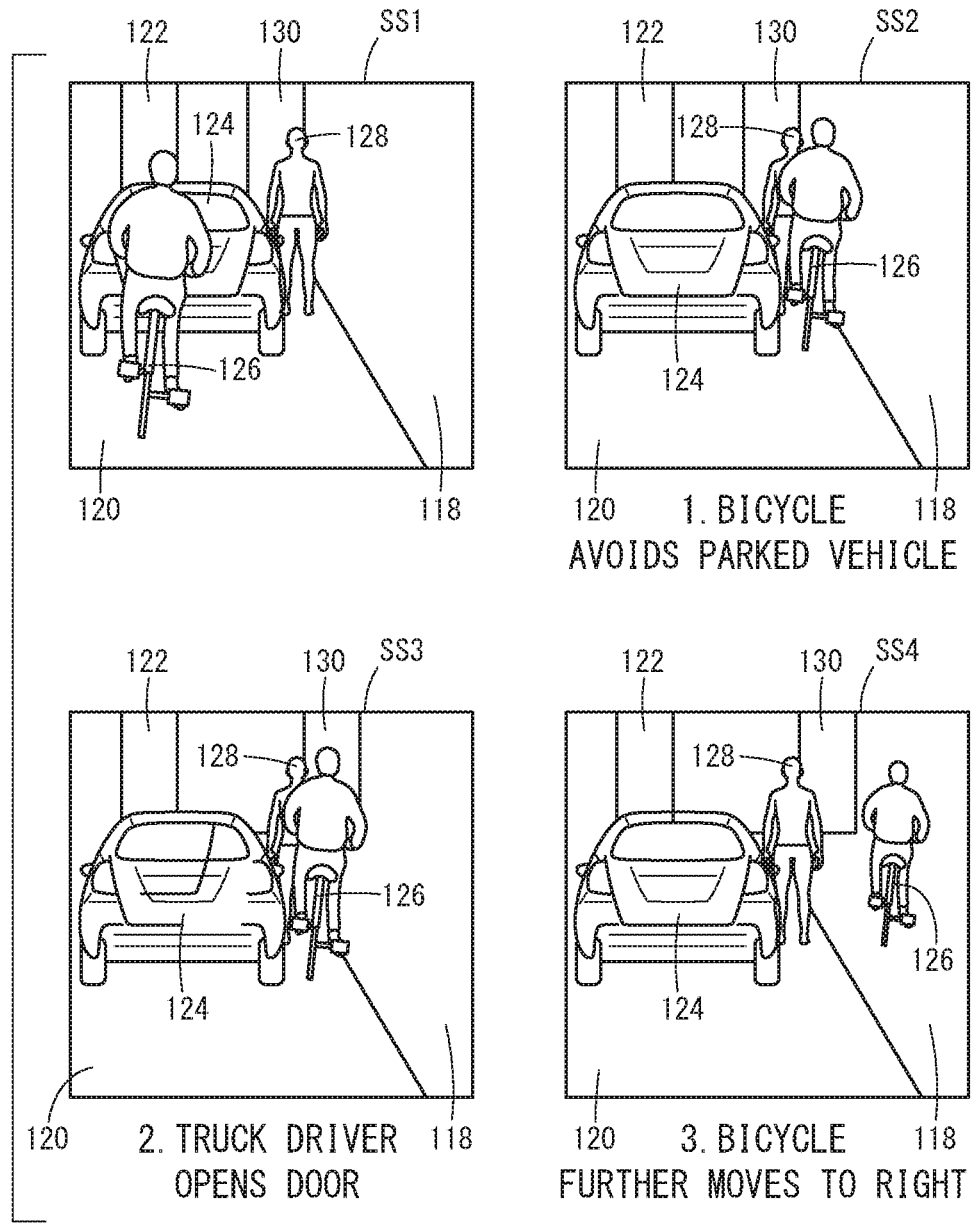

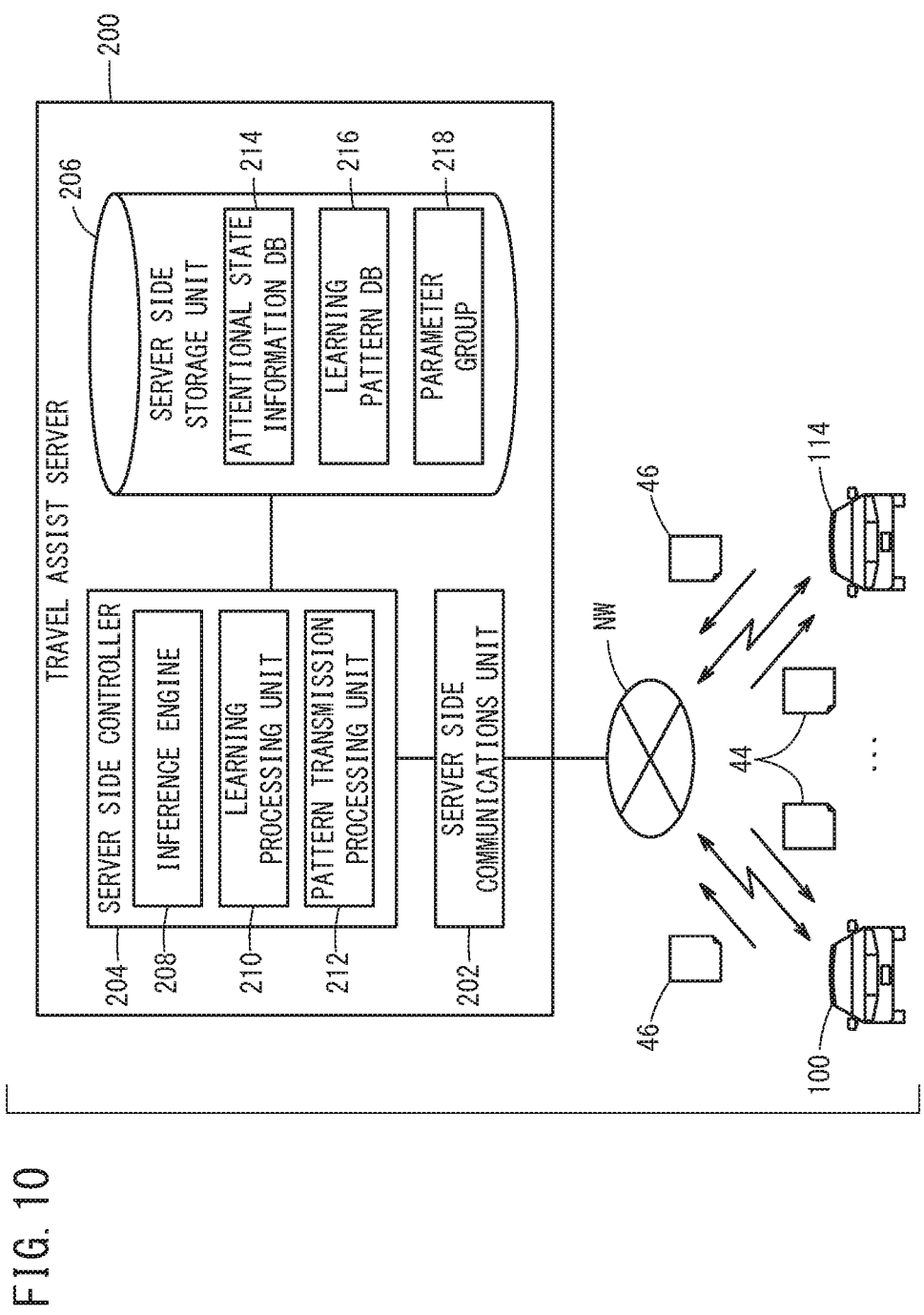

VEHICLE CONTROL SYSTEM AND METHOD, AND TRAVEL ASSIST SERVER

CROSS-REFERENCE TO RELATED APPLICATION

This application is based upon and claims the benefit of priority from Japanese Patent Application No. 2017-110354 filed on Jun. 2, 2017, the contents of which are incorporated herein by reference.

BACKGROUND OF THE INVENTION

Field of the Invention

The present invention relates to vehicle control system and method, and a travel assist server.

Description of the Related Art

Various techniques have conventionally been developed for detecting a state regarding travel of a host vehicle and predicting a relation with a traffic participant around the host vehicle on the basis of a detection result.

For example, Japanese Laid-Open Patent Publication No. 2012-059058 (FIGS. 7 and [0109], for example) suggests an on-vehicle device that learns a correlation between sensor information and a collision risk prediction level in advance and estimates the risk for the vehicle on the basis of the sensor information obtained for each traffic scene of the vehicle. In this suggestion, a server provided separately from the vehicle performs the above learning by using learning data (for example, time-series data of sensor information) collected from vehicles, and the learning result is shared.

SUMMARY OF THE INVENTION

In Japanese Laid-Open Patent Publication No. 2012-059058 (FIGS. 7 and [0109], for example), various pieces of sensor information and the collision risk levels are stored in time series while being associated with each other; therefore, data are stored regardless of a particular condition. This results in a problem that a data storage capacity and a processing load increase and a manufacturing cost therefore increases.

The present invention has been made in order to solve the above problem and an object is to provide vehicle control system and method, and a travel assist server that can effectively reduce a processing load when handling information obtained from a host vehicle.

A vehicle control system according to a first aspect of the present invention includes: a state detection unit configured to detect at least one of a travel state of a host vehicle, an operation state of an operation device mounted on the host vehicle, and an environment state around or inside the host vehicle; a travel controller configured to perform a travel control in which at least a part of a speed control or a steering control for the host vehicle is automated on the basis of a detection result from the state detection unit; and a state extraction unit configured to, if a state detected by the state detection unit satisfies an extraction condition while the travel controller performs the travel control, extract in time series information regarding the detected state as learning data for correcting the travel control by the travel controller.

In this manner, the state around or inside the vehicle is obtained in time series as the learning data for the travel control in a case where the extraction condition is satisfied while the travel control is performed. Therefore, the necessary information can be extracted appropriately. As a result, the communication capacity and the processing load when the information obtained from the host vehicle is handled can be effectively reduced.

In addition, the vehicle control system according to the first aspect of the present invention may further include: a communications unit configured to communicate with an external device; and a communication controller configured to, if a transmission condition regarding the state detected by the state detection unit is satisfied while the travel controller performs the travel control, perform a transmission control in which state information representing the travel state, the operation state, or the environment state is transmitted to the external device through the communications unit.

Thus, in a case where the transmission condition regarding the detected state is satisfied while the travel controller performs the travel control, the state information representing the travel state, the operation state, or the environment state is transmitted. Therefore, a traffic scene where an attentional level is relatively high is specified by the setting of the transmission condition and only the state information in the traffic scene can be effectively extracted and transmitted. As a result, the communication capacity and the processing load when the information obtained from the host vehicle is transmitted to the external device can be reduced.

Moreover, the state extraction unit may be configured to perform the extraction at least when the state detection unit has detected any of the following states: the travel state or the environment state in which an object is in contact with the host vehicle; the travel state in which the amount of braking the host vehicle is more than a predetermined value; the operation state in which the amount of operating a brake pedal of the host vehicle is more than a predetermined value; and the travel state in which a behavior of the host vehicle has changed to deviate from an allowable range. Since the traffic scene after the object is brought into contact with the host vehicle or the traffic scene where the host vehicle attempts to avoid any contact with the object is specified in this manner, the state information that is useful for a posterior analysis can be extracted and transmitted timely.

In addition, the state extraction unit may be configured to perform the extraction at least when the state detection unit has detected the operation state in which a driver of the host vehicle touches or operates the operation device regarding the steering control. In this manner, it is possible to specify the traffic scene strongly reflecting the intention of the driver who has made a decision that the steering operation is necessary. Therefore, the state information that is useful for the posterior analysis can be extracted and transmitted timely.

In addition, the state extraction unit may be configured to perform the extraction at least when any of the following components has deteriorated in performance: the communications unit, the travel controller, the state detection unit, and the operation device. The traffic scene in which the travel of the host vehicle is difficult temporarily or continuously can be specified in this manner. Thus, the state information that is useful for the posterior analysis can be extracted and transmitted timely.

Moreover, the state extraction unit may be configured to perform the extraction at least when the state detection unit has detected the environment state in which a moving object or a movable object around the host vehicle is predicted to have an influence on the travel of the host vehicle. In this manner, the traffic scene in which the high-level driving decision-making is required to avoid any contact with the moving object or the movable object can be specified. Thus, the state information that is useful for the posterior analysis can be extracted and transmitted timely.

In addition, the state extraction unit may be configured to perform the extraction at least when the state detection unit has detected the environment state in which a level of the influence to be caused by the moving object or the movable object on the travel of the host vehicle is evaluated as being more than or equal to a threshold. The traffic scene in which the possibility of contacting with the moving object or the movable object is high can be specified on the basis of the quantitative evaluation result. Therefore, the state information that is useful for the posterior analysis can be extracted and transmitted timely.

Moreover, the state extraction unit may be configured to perform the extraction when the state detection unit has detected an environment state that is the same as or similar to an environment state pattern as a reference target. Since this can specify the traffic scene in which the possibility of the contact with the moving object or the movable object is high on the basis of the conformity of the patterns of the environment state, the state information that is useful for the posterior analysis can be extracted and transmitted timely.

In addition, the state extraction unit may be configured to perform the travel control to cause the host vehicle to travel along a target trajectory, and the state extraction unit may be configured to perform the extraction when the state detection unit has detected the environment state in which the moving object or the movable object has entered a scheduled travel region including the target trajectory or is predicted to enter the scheduled travel region. In this manner, the traffic scene in which on the condition that the host vehicle continues to travel further in the current travel state, the possibility of contacting with the moving object or the movable object is high can be specified. Thus, the state information that is useful for the posterior analysis can be extracted and transmitted timely.

In addition, the state extraction unit may be configured to perform the extraction at least when the state detection unit has detected both the following states at the same time: the travel state in which the amount of braking the host vehicle is more than a predetermined value; and the environment state in which a moving object or a movable object appears around the host vehicle. This makes it possible to effectively exclude the traffic scene in which the host vehicle performs a braking operation regardless of the purpose of avoiding the contact with the object.

In addition, the communication controller may be configured to perform the transmission control by variably setting sampling intervals of the state information in accordance with a level of an influence of a moving object or a movable object around the host vehicle on travel of the host vehicle. Thus, the amount of information that is suitable for each traffic scene can be set sensitively.

In addition, the system may further include a trajectory generation unit configured to generate a target trajectory involved in the travel control. Thus, the trajectory generation unit may be configured to, when the state detection unit has detected the environment state that is the same as or similar to a pattern of the environment state as a reference target, generate the target trajectory on the basis of the pattern. This enables the appropriate travel control based on the assumption of the environment state pattern.

In addition, the system may further include an influence level evaluation unit configured to evaluate a level of an influence of a moving object or a movable object around the host vehicle on travel of the host vehicle, wherein the trajectory generation unit may be configured to generate the target trajectory in which the level of the influence is relatively low. This enables the appropriate travel control in which the influence on the travel of the host vehicle is reduced as much as possible.

A vehicle control method according to a second aspect of the present invention includes: a detection step of detecting at least one of a travel state of a host vehicle, an operation state of an operation device mounted on the host vehicle, and an environment state around or inside the host vehicle; a control step of performing a travel control in which at least a part of a speed control or a steering control for the host vehicle is automated on the basis of a detection result in the detection step; and an extraction step of, if a state detected in the detection step satisfies an extraction condition while the travel control is performed in the control step, extracting in time series, information regarding the detected state as learning data for correcting the travel control in the control step.

A vehicle control method according to a third aspect of the present invention is a method using a vehicle control system including a communications unit configured to communicate with an external device, and a state detection unit configured to detect at least one of a travel state of a host vehicle, an operation state of an operation device mounted on the host vehicle, and an environment state around or inside the host vehicle, and the vehicle control method includes: a control step of performing a travel control in which at least a part of a speed control or a steering control for the host vehicle is automated on the basis of a detection result from the state detection unit; and a transmission step of, if a transmission condition regarding the state detected by the state detection unit is satisfied while the travel control is performed, transmitting state information representing the travel state, the operation state, or the environment state to the external device through the communications unit.

A travel assist server according to a fourth aspect of the present invention is configured to accumulate the state information transmitted from any one of the aforementioned vehicle control systems. As a result, the communication capacity and the processing load when the information obtained from the host vehicle is received can be effectively reduced.

By the vehicle control system and method, and the travel assist server according to the present invention, the communication capacity and the processing load when the information obtained from the host vehicle is handled can be effectively reduced.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a table expressing one example of a transmission condition used in a determination process;

FIG. 5 expresses an operation of a communication controller over a period before and after a trigger time point in a time-series manner;

FIGS. 6A and 6B are explanatory diagrams for describing a procedure of calculating an influence level;

FIG. 7 expresses one example of pattern information;

FIG. 10 is a block diagram illustrating a structure of a travel assist server in one embodiment of the present invention;

DESCRIPTION OF THE PREFERRED EMBODIMENTS

A preferred embodiment of a vehicle control system according to the present invention is described with reference to the attached drawings regarding a relation with a vehicle control method and a travel assist server.

[Structure of Vehicle Control System 10]

<Overall Structure>

Figure 1:
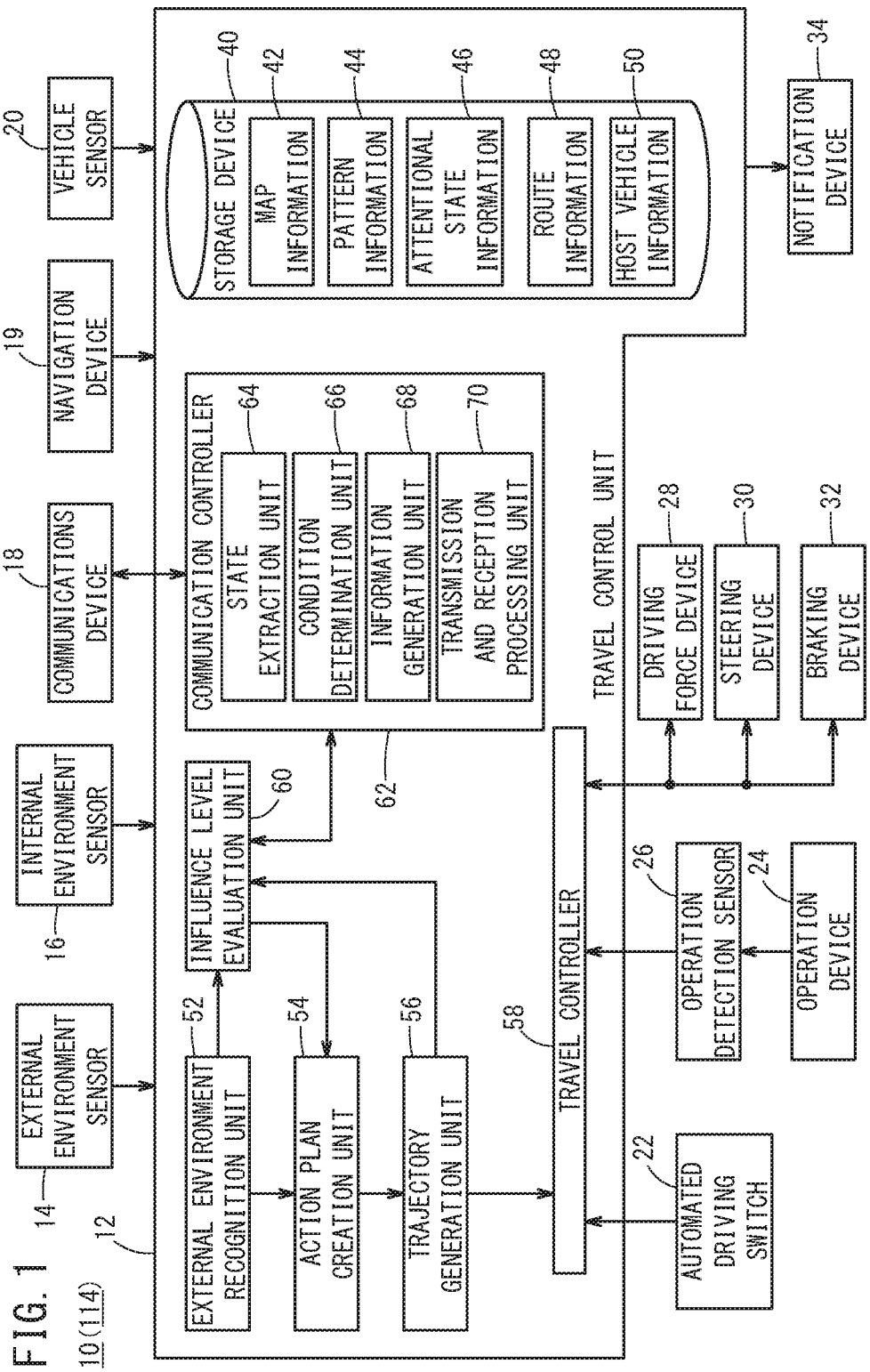
FIG. 1 is a block diagram illustrating a structure of a vehicle control system according to one embodiment of the present invention.

FIG. 1 is a block diagram illustrating a structure of a vehicle control system 10 according to one embodiment of the present invention. The vehicle control system 10 is incorporated in a vehicle (host vehicle 100, another vehicle 114 in FIG. 3, etc.) and controls the travel of the vehicle either automatically or manually. This "automated driving" refers to a concept including not just "fully automated driving" in which the travel control of the vehicle is fully automated but also "partially automated driving" in which the travel control is partially automated.

The vehicle control system 10 basically includes an input device group, an output device group, and a travel control unit 12. Devices in the input device group and the output device group are connected to the travel control unit 12 through communication lines.

The input device group includes an external environment sensor 14 (state detection unit), an internal environment sensor 16 (state detection unit), a communication device 18 (communications unit), a navigation device 19, a vehicle sensor 20 (state detection unit), an automated driving switch 22, and an operation detection sensor 26 (state detection unit) connected to an operation device 24.

The output device group includes a driving force device 28 that drives wheels that are not shown, a steering device 30 that steers the wheels, a braking device 32 that brakes the wheels, and a notification device 34 that notifies a driver visually or audibly.

<Specific Structure of Input Device Group>

The external environment sensor 14 obtains information representing an external environment of the vehicle (hereinafter, external environment information), and outputs the external environment information to the travel control unit 12. The external environment sensor 14 specifically includes a camera, a radar, and a light detection and ranging/laser imaging detection and ranging (LIDAR).

The internal environment sensor 16 obtains information representing an internal environment of the vehicle (hereinafter, internal environment information), and outputs the internal environment information to the travel control unit 12. The internal environment sensor 16 specifically includes a sensor group that detects an operation state of the on-vehicle device, and an in-vehicle camera that can capture a state inside the vehicle.

The communication device 18 is configured to communicate with a roadside device, another vehicle, and an external device including a server. For example, the communication device 18 transmits and receives information regarding traffic equipment, information regarding other vehicles, probe information, map information 42, pattern information 44, or attentional state information 46 (state information). The map information 42 is stored in a predetermined memory area in the storage device 40 or in the navigation device 19. The pattern information 44 and the attentional state information 46 that will be described below are stored in the predetermined memory area in the storage device 40.

The navigation device 19 includes a satellite positioning device that can detect a current position of the vehicle, and a user interface (for example, a touch panel type display, a speaker, and a microphone). The navigation device 19 calculates a route to a designated destination on the basis of the current position of the vehicle or the position designated by a user, and outputs the route to the travel control unit 12. The route calculated by the navigation device 19 is stored as route information 48 in the predetermined memory area in the storage device 40.

The vehicle sensor 20 includes a speed sensor that detects a travel speed of the vehicle (vehicle speed), an acceleration sensor that detects a longitudinal acceleration or a lateral acceleration, a yaw-rate sensor that detects an angular speed around a vertical axis, a direction sensor that detects an orientation and a direction, and a gradient sensor that detects a gradient. The vehicle sensor 20 outputs a detection signal from each sensor to the travel control unit 12. The detection signals are stored as own vehicle information 50 in the predetermined memory area in the storage device 40.

The automated driving switch 22 includes, for example, a pressing button type hardware switch or a software switch using the navigation device 19. The automated driving switch 22 is configured to switch a plurality of driving modes by a manual operation of the user including the driver.

The operation device 24 includes an accelerator pedal, a steering wheel, a brake pedal, a shift lever, and a direction indicator lever. The operation device 24 includes the operation detection sensor 26 that detects whether the driver operates, the amount of operation, and the position of the operation.

The operation detection sensor 26 outputs to a travel controller 58, detection results including the depression amount of the accelerator pedal (accelerator opening), the amount of operating the steering (steering amount), the depression amount of the braking pedal, a shift position, and a right or left direction to which the vehicle turns.

<Specific Structure of Output Device Group>

The driving force device 28 includes a driving force electronic control unit (ECU), and a driving source including an engine and/or driving motor. The driving force device 28 generates a travel driving force (torque) of the vehicle in accordance with a travel control value input from the travel controller 58, and transmits the travel driving force to wheels directly or indirectly through a transmission.

The steering device 30 includes an electric power steering system (EPS), an ECU, and an EPS device. The steering device 30 changes a direction of the wheels (steered wheels) in accordance with the travel control value input from the travel controller 58.

The braking device 32 is, for example, an electric servo brake with which a hydraulic brake is used in combination, and includes a brake ECU and a brake actuator. The braking device 32 brakes the wheels in accordance with the travel control value input from the travel controller 58.

The notification device 34 includes a notification ECU, a display device, and an acoustic device. The notification device 34 performs a notification operation regarding automated driving or manual driving in response to a notification instruction output from the travel control unit 12.

<Driving Mode>

Here, every time the automated driving switch 22 is pressed, "automated driving mode" and "manual driving mode" (non-automated driving mode) are sequentially switched. Instead of this, in order to check the driver's intention for sure, for example, pressing the switch twice may change the driving mode from the manual driving mode to the automated driving mode, and pressing the switch once may change the driving mode from the automated driving mode to the manual driving mode.

In the automated driving mode, the vehicle travels under control of the travel control unit 12 in a state that the driver does not operate the operation device 24 (specifically, accelerator pedal, steering wheel, and brake pedal). In other words, in the automated driving mode, the travel control unit 12 controls entirely or partially the driving force device 28, the steering device 30, and the braking device 32 in accordance with an action plan that is created sequentially.

Note that if the driver performs a predetermined operation using the operation device 24 in the automated driving mode, the automated driving mode is automatically cancelled and the driving mode is switched to a driving mode in which the level of the automated driving is relatively low (including manual driving mode). A driver's operation of the automated driving switch 22 or the operation device 24 to shift the automated driving to the manual driving is also referred to as "takeover operation".

<Structure of Travel Control Unit 12>

The travel control unit 12 includes one or a plurality of ECUs, and a various function achievement unit in addition to the storage device 40 described above. In this embodiment, the function achievement unit is a software function unit that achieves a function by causing one central processing unit (CPU) or a plurality of CPUs to execute programs in the storage device 40 that is non-transient. Instead of this, the function achievement unit may be a hardware function unit including integrated circuits such as a field-programmable gate array (FPGA).

The travel control unit 12 includes, in addition to the storage device 40 and the travel controller 58, an external environment recognition unit 52, an action plan creation unit 54, a trajectory generation unit 56, an influence level evaluation unit 60, and a communication controller 62.

The external environment recognition unit 52 recognizes a lane mark (white line) on each side of the vehicle by using various pieces of information input through the input device group (for example, external environment information from the external environment sensor 14), and generates positional information of a stop line or a traffic light, or "static" external environment recognition information including a travel possible region. The external environment recognition unit 52 generates "dynamic" external environment recognition information including an obstacle such as a parked or stopped vehicle, a traffic participant such as a person or another vehicle, or the color of a traffic light by using various pieces of information that are input.

The action plan creation unit 54 creates an action plan (events in time series) for each travel section on the basis of the recognition result from the external environment recognition unit 52, and updates the action plan as necessary. Examples of the kind of events include deceleration, acceleration, branch, merge, intersection, lane keeping, lane changing, and passing. Here, "deceleration" and "acceleration" are the events of decelerating and accelerating the vehicle, respectively. In addition, "branch", "merge", and "intersection" are the events of making the vehicle smoothly travel at a branch point, a merge point, and an intersection, respectively. Furthermore, "lane changing" is the event of making the vehicle change the travel lane (that is, change a route), and "passing" is the event of making the vehicle pass a preceding vehicle.

Note that "lane keeping" is the event of making the vehicle travel so as not to deviate from the travel lane, and is segmented based on the combination with a travel mode. Specific examples of the travel modes include a constant-speed travel, a following travel, a decelerated travel, a curve travel, and an obstacle avoiding travel.

The trajectory generation unit 56 generates a travel trajectory (target behaviors in time series) in accordance with the action plan created by the action plan creation unit 54 by using the map information 42, the route information 48, and the host vehicle information 50 read out from the storage device 40. This travel trajectory is, for example, a time-series data set whose data unit is a position, a posture angle, speed, acceleration, a curvature, a yaw rate, and a steering angle.

The travel controller 58 determines each travel control value for controlling the travel of the vehicle in accordance with the travel trajectory (target behaviors in time series) generated by the trajectory generation unit 56. Then, the travel controller 58 outputs the obtained travel control values to the driving force device 28, the steering device 30, and the braking device 32.

The influence level evaluation unit 60 performs an evaluation process regarding the level of the influence on the travel of the vehicle by using the recognition result from the external environment recognition unit 52, the pattern information 44 read out from the storage device 40, or the target trajectory from the trajectory generation unit 56. Then, the influence level evaluation unit 60 outputs the obtained quantitative or qualitative evaluation result to the action plan creation unit 54 or the communication controller 62.

The communication controller 62 performs a transmission control or a reception control of various pieces of information using the communication device 18.

Specifically, the communication controller 62 functions as a state extraction unit 64, a condition determination unit 66, an information generation unit 68, and a transmission and reception processing unit 70.

[Operation of Vehicle Control System 10]

<Overall Flow>

Figure 2:
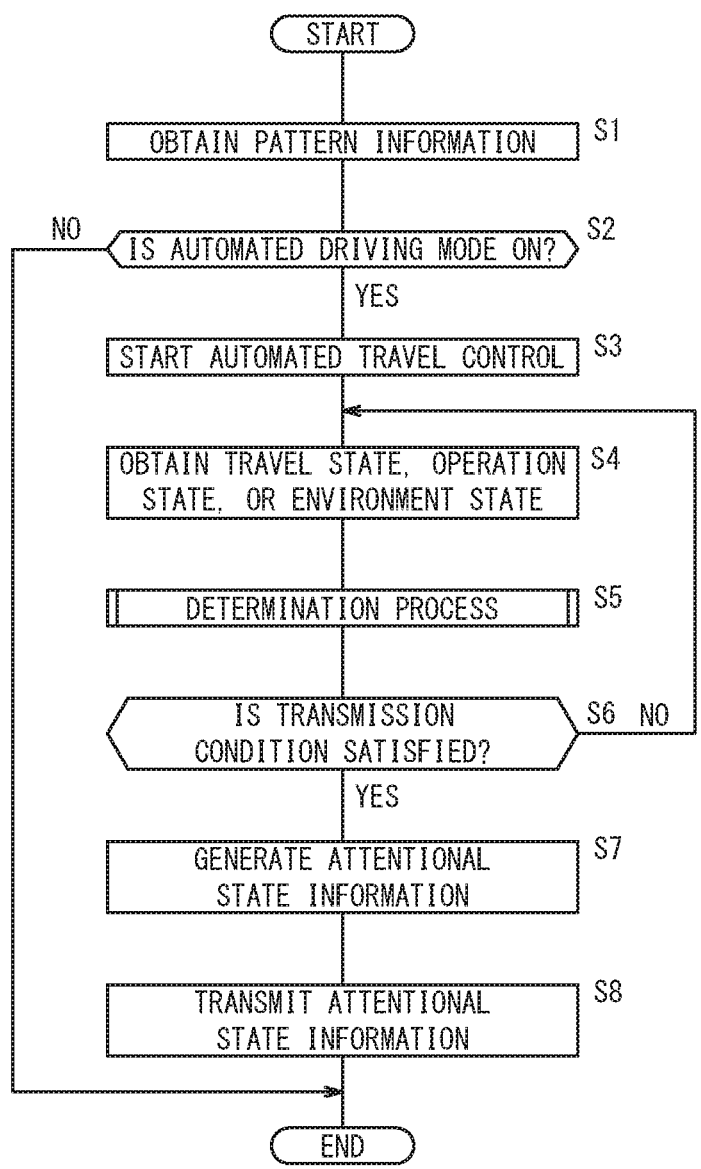
FIG. 2 is a flowchart for describing an operation of the vehicle control system illustrated in FIG. 1.

The vehicle control system 10 according to the present embodiment has the structure described above. Next, description of an operation of the vehicle control system 10 is given (particularly, a transmission operation of the communication controller 62) mainly with reference to a flowchart of FIG. 2. Here, it is assumed that the host vehicle 100 including the vehicle control system 10 travels automatically or manually.

In step S1, the communication controller 62 obtains the pattern information 44 from the external device through the communication device 18. Specifically, the transmission and reception processing unit 70 performs a reception control of receiving the pattern information 44 from a travel assist server 200 (FIG. 10) through the communication device 18, and then stores the received latest pattern information 44 in the storage device 40.

In step S2, the travel control unit 12 determines whether the automated driving mode (automated driving switch 22) is on. If it is determined that the automated driving mode is not on (is off) (step S2: NO), the vehicle control system 10 ends the flowchart in FIG. 2. On the other hand, if it is determined that the automated driving mode is on (step S2: YES), the process advances to the next step S3.

In step S3, the travel controller 58 starts the travel control in accordance with the driving mode. Thus, the travel controller 58 performs the travel control in which at least a part of a speed control or a steering control of the host vehicle 100 is automated.

In step S4, the state extraction unit 64 obtains at least one state of the travel state, the operation state, and the environment state. Specifically, the state extraction unit 64 obtains the travel state of the host vehicle 100 from the vehicle sensor 20, and obtains the operation state of the operation device 24 from the operation detection sensor 26. The state extraction unit 64 obtains the environment state around the host vehicle 100 from the external environment sensor 14, and obtains the environment information inside the host vehicle 100 from the internal environment sensor 16.

Figure 3:
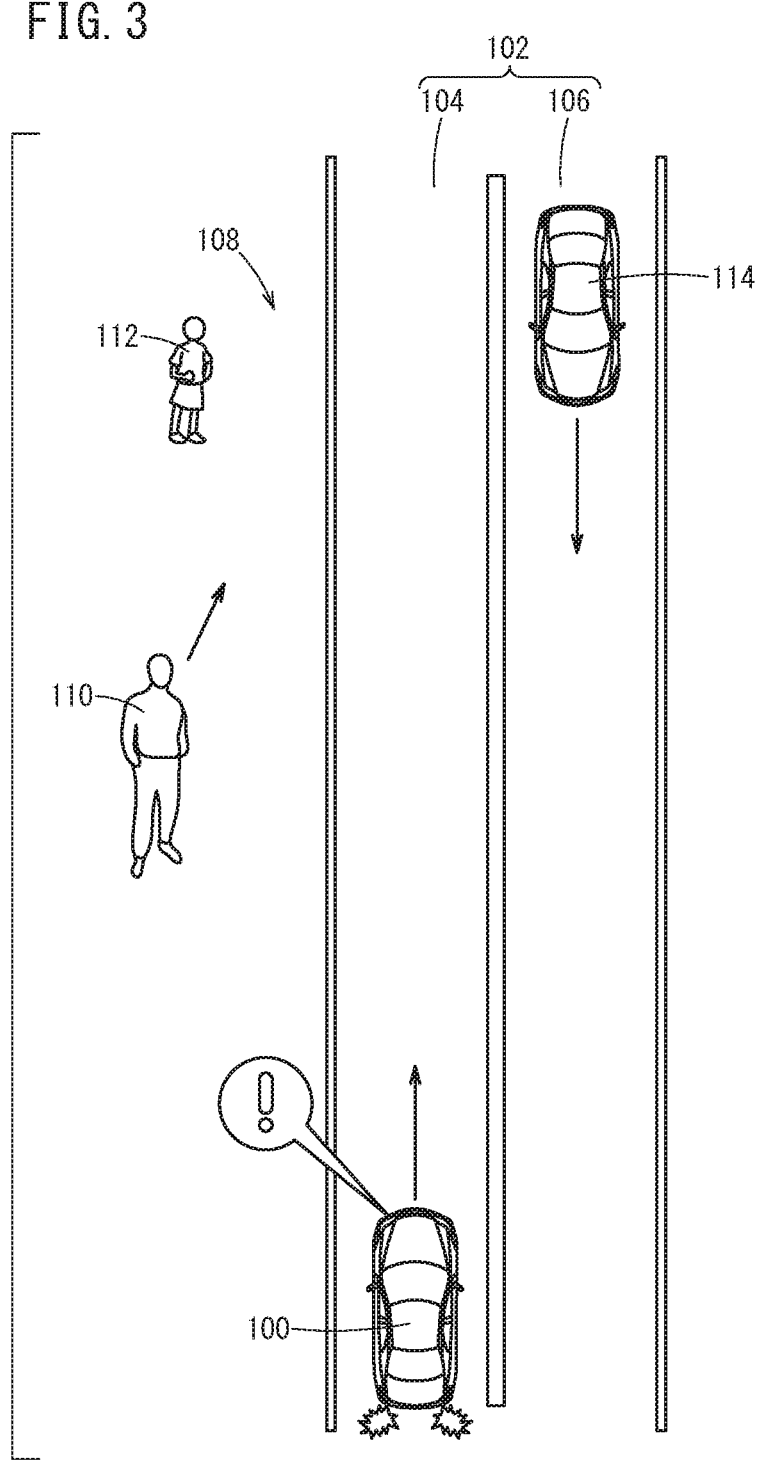
FIG. 3 is a plan view illustrating a traffic scene in which a host vehicle travels on a straight road.

FIG. 3 is a plan view illustrating a traffic scene in which the host vehicle 100 travels on a road 102 that is straight. The road 102 includes two lanes of a travel lane 104 where the host vehicle 100 travels, and an opposite lane 106 that is opposite to the travel lane 104. FIG. 3 illustrates the road in a region where vehicles should travel on a left side.

On a pedestrian walkway 108 beside the travel lane 104, there are two pedestrians 110, 112 who are moving or stand still ahead of the host vehicle 100. Moreover, on the opposite lane 106, there is another vehicle 114 that travels toward the host vehicle 100.

In step S5, the condition determination unit 66 performs a determination process to determine whether a transmission condition is satisfied, on the basis of at least one state obtained in step S4. This transmission condition is a condition to specify a traffic scene to which the vehicles including the host vehicle 100 should pay attention more.

FIG. 4 is a table expressing one example of the transmission condition to be used in the determination process, and specifically showing six individual conditions (individual conditions 1 to 6). Here, it is determined that the transmission condition is satisfied when at least one of the six individual conditions are satisfied. Note that the content and the total number of individual conditions are not limited to the example in this table, and an arbitrary individual condition may be set, or the transmission condition may be satisfied when a combination of two or more individual conditions is satisfied at the same time.

In step S6, the condition determination unit 66 checks if the transmission condition is satisfied by the determination result in step S5. If the transmission condition is not satisfied (step S6: NO), the process returns to step S4 and steps S4 to S6 are sequentially repeated. On the other hand, if the transmission condition is satisfied (step S6: YES), the process advances to the next step S7.

In step S7, the information generation unit 68 generates state information (i.e., attentional state information 46) that is sampled over a period before and after the transmission condition is satisfied in step S6 (trigger time point). This attentional state information 46 includes, for example, time-series data of camera images (moving image), positional information, posture information, and a time stamp.

In step S8, the transmission and reception processing unit 70 transmits the attentional state information 46 generated in step S7, to the external device through the communication device 18. Specifically, the transmission and reception processing unit 70 performs a transmission control to transmit the attentional state information 46 that has not been transmitted yet and is read out from the storage device 40, to the travel assist server 200 (FIG. 10) through the communication device 18.

FIG. 5 depicts an operation of the communication controller 62 over a period before and after the trigger time point in a time-series manner. Above the time axis, the time points where the events occur are shown. Below the time axis, sampling conditions of the state information are shown.

First, the time point where the transmission condition is satisfied (trigger time point) is $t=t0$. The information generation unit 68 starts the process for generating the attentional state information 46 at $t=t1$ ($>t0+Tf$). The information generation unit 68 generates the attentional state information 46 for a total collection time Ts ($=Tb+Tf$) by summing [1] information for a collection time Tb before $t=t0$ (sampling interval: $\Delta b$) and [2] information for a collection time Tf after $t=t0$ (sampling interval: $\Delta f$). Then, the transmission and reception processing unit 70 performs a process for transmitting the attentional state information 46 at $t=t2$ ($>t1$).

Note that each of the collection times Tb and Tf may be either a fixed value (for example, $Tb=Tf=5s$) or a variable value (for example, $Tb<Tf$). Similarly, the sampling intervals $\Delta b$, $\Delta f$ (for example, $\Delta b > \Delta f$) may be either a fixed value or a variable value.

Thus, the operation of the vehicle control system 10 (particularly, the transmission operation by the communication controller 62) ends. By regularly or irregularly performing the flowchart of FIG. 2 subsequently, the attentional state information 46 that is useful for a posterior analysis can be transmitted timely.

Note that the communication controller 62 may perform the transmission control by variably setting the sampling intervals of the attentional state information 46 in accordance with a level of an influence of a moving object or a movable object around the host vehicle 100 on the travel of the host vehicle 100 (level of influence will be described below). Thus, the amount of information that is suitable for each traffic scene can be set in detail.

[Specific Example of Determination Process (Step S5 in FIG. 2)]

Next, a specific example of the determination process by the condition determination unit 66 in the communication controller 62 is described in detail with reference to FIG. 6A to FIG. 9.

<Condition 1: When Shock is Applied to Host Vehicle 100>

The communication controller 62 (condition determination unit 66) may perform the transmission control at least when detecting any of the following states: (a) a travel state or an environment state in which an object is in contact with the host vehicle 100; (b) a travel state in which the amount of braking the host vehicle 100 is more than a predetermined value; (c) an operation state in which the amount of operating a brake pedal of the host vehicle 100 is more than a predetermined value; and (d) a travel state in which the behavior of the host vehicle 100 has derived from an allowable range.

In a specific example, when a detection value of the acceleration sensor (an instantaneous value or values in time series) exceeding a threshold may be used as a trigger for the condition determination unit 66 to detect a time point where a shock is applied to the host vehicle 100, that is, a time point where an object is brought into contact with the host vehicle 100 or a time point where sudden braking occurs manually or automatically.

With the detection, the traffic scene after the object is brought into contact with the host vehicle 100 or the traffic scene where the host vehicle 100 attempts to avoid the contact with the object can be specified. Thus, the attentional state information 46 that is useful for the posterior analysis can be extracted and transmitted timely.

As an improvement of Condition 1, the communication controller 62 may perform the transmission control in a case where the following states are both detected at the same time: (b) the travel state in which the amount of braking the host vehicle 100 is more than the predetermined value; and (e) an environment state in which the moving object or the movable object appears around the host vehicle 100. This makes it possible to effectively exclude the traffic scene in which the host vehicle 100 performs a braking operation regardless of the purpose of avoiding the contact with an object.

<Condition 2: When Takeover has Occurred>

The communication controller 62 (condition determination unit 66) may perform the transmission control at least when detecting the operation state in which the driver of the host vehicle 100 touches or operates the operation device 24 regarding the steering control.

In a specific example, the detection value of a gripping sensor provided to the steering wheel exceeding a threshold may be used as a trigger for the condition determination unit 66 to detect the time point where the takeover has occurred.

The detection can specify the traffic scene strongly reflecting the intention of the driver who has made a decision that the steering operation is necessary. Therefore, the attentional state information 46 that is useful for the posterior analysis can be extracted and transmitted timely.

<Condition 3: When Performance has Deteriorated>

The communication controller 62 (condition determination unit 66) may perform the transmission control at least when any of the following components has deteriorated in performance: the communication device 18, the travel controller 58, the state detection unit (external environment sensor 14, internal environment sensor 16, operation detection sensor 26), and the operation device 24.

Here, "deterioration in performance" may refer to a state in which the function of the component has been lost temporarily (that is, function failure) as the travel environment changes, or a state in which continuation of the automated driving control has become difficult (that is, performance limit) as the travel environment changes.

Since the traffic scene in which the travel of the host vehicle 100 is difficult temporarily or continuously can be thus specified, the attentional state information 46 that is useful for the posterior analysis can be extracted and transmitted timely.

<Condition 4: When Travel Influence is Recognized (1)>

The communication controller 62 (condition determination unit 66) may perform the transmission control at least when detecting the environment state in which the moving object or the movable object around the host vehicle 100 is predicted to have an influence on the travel of the host vehicle 100. The traffic scene in which the high-level driving decision-making is required to avoid the contact with the moving object or the movable object can be thus specified. Therefore, the state information that is useful for the posterior analysis can be extracted and transmitted timely.

Here, the influence level evaluation unit 60 quantitatively evaluates the level of the influence of each body on the host vehicle 100. A procedure of calculating the influence level is described with reference to FIGS. 6A and 6B.

FIGS. 6A and 6B are common in that there are the host vehicle 100 and another vehicle 114 on the road 102 and the pedestrians 110 and 112 on the pedestrian walkway 108, but are different in the posture (moving direction) of the pedestrian 112 and the position of another vehicle 114.

In each graph, the horizontal axis represents a position in a vehicle width direction and the vertical axis represents the influence level. In the graph, the influence level has three peaks P1 to P3 corresponding to local maximum values at the positions of the bodies. The peak P1 corresponds to the pedestrian 110, the peak P2 corresponds to the pedestrian 112, and the peak P3 corresponds to another vehicle 114.

In FIG. 6A, the pedestrian 112 faces the travel lane 104 and another vehicle 114 is relatively close to the host vehicle 100. That is to say, the values of the peaks P2 and P3 are relatively high and are more than a predetermined threshold in a part of the graph. In this case, it is predicted that the influence of the pedestrian 112 and another vehicle 114 on the travel of the host vehicle 100 is large.

In FIG. 6B, the pedestrian 112 faces opposite to the travel lane 104 and another vehicle 114 is relatively far from the host vehicle 100. That is to say, the values of the peaks P2 and P3 are relatively low and the values in the entire graph are less than the predetermined threshold. In this case, it is predicted that the influence of the pedestrians 110, 112 and another vehicle 114 on the travel of the host vehicle 100 is small.

Thus, the communication controller 62 (condition determination unit 66) may perform the transmission control at least when detecting the environment state in which the level of the influence of the moving object or the movable object on the travel of the host vehicle 100 is evaluated as being more than or equal to the threshold. The traffic scene in which the possibility of the contact with the moving object or the movable object is high can be thus specified on the basis of the quantitative evaluation result.

<Condition 5: When Travel Influence is Recognized (2)>

In a manner similar to the case of Condition 4, the communication controller 62 (condition determination unit 66) may perform the transmission control at least when detecting the environment state in which the moving object or the movable object around the host vehicle 100 is predicted to have an influence on the travel of the host vehicle 100. Here, the influence level evaluation unit 60 evaluates the conformity between a pattern of the environment state expressed by the pattern information 44 (reference target) and the actually detected environment state. An example of the pattern information 44 is hereinafter described with reference to FIG. 7.

As illustrated in FIG. 7, the pattern information 44 includes snapshots SS1 to SS4 depicting traffic scenes in time series. The snapshot SS1 illustrates a situation in which a truck 122 and a car 124 are parked on a road shoulder 120 in a lane 118 and the truck 122 is in front of the car 124. In this situation, a bicycle 126 comes from behind the car 124.

For example, the bicycle 126 moves to right toward the lane 118 in order to circumvent the car 124 ahead, and tries to keep going (SS2). At the same timing, a driver 128 of the truck 122 opens a rear door 130 to extract a load (SS3). In this case, the bicycle 126 moves further to right in order to circumvent the rear door 130 that has been opened, and still tries to keep going (SS4).

That is to say, in a case where the host vehicle 100 traveling on the lane 118 undergoes in the environment shown in the snapshot SS1, it is less likely that the host vehicle 100 is brought into contact with the bicycle 126 at the time point of SS1, but at the time point of SS4, it becomes more likely that the host vehicle 100 is brought into contact with the bicycle 126.

Thus, the communication controller 62 (condition determination unit 66) may perform the transmission control at least when detecting the environment state that is the same as or similar to the pattern of the environment state to be the reference target. The traffic scene in which the possibility of the contact with the moving object or the movable object is high is specified on the basis of the conformity of the patterns of the environment state.

Therefore, the state information that is useful for the posterior analysis can be extracted and transmitted timely.

<Condition 6: When Travel Influence is Recognized (3)>

In a manner similar to the case of Condition 4 and Condition 5, the communication controller 62 (condition determination unit 66) may perform the transmission control at least when detecting the environment state in which the moving object or the movable object around the host vehicle 100 is predicted to have an influence on the travel of the host vehicle 100. Here, the influence level evaluation unit 60 evaluates the possibility of each body to enter a scheduled travel region 142 of the host vehicle 100. The description is given with reference to a flowchart of FIGS. 8 and 9.

In step S51, the action plan creation unit 54 predicts the next traffic scene on the basis of the recognition result from the external environment recognition unit 52 and creates an action plan in accordance with the prediction result. In the prediction of the traffic scene, the action plan creation unit 54 may take the conformity of the patterns of the environment state into consideration by additionally using the pattern information 44 (FIG. 7).

In this case, the trajectory generation unit 56 detects the environment state that is the same as or similar to the pattern as the reference target and then generates the target trajectory 140 on the basis of the pattern. This enables the appropriate travel control that is performed in consideration of the pattern of the environment state.

In step S52, the trajectory generation unit 56 generates the target trajectory 140 of the host vehicle 100 on the basis of the traffic scene predicted in step S51, and supplies the obtained target trajectory 140 to the influence level evaluation unit 60. For example, the trajectory generation unit 56 may generate the target trajectory 140 in which the influence level evaluated by the influence level evaluation unit 60 is relatively low. This enables the appropriate travel control in which the influence on the travel of the host vehicle 100 is reduced as much as possible.

In step S53, the influence level evaluation unit 60 determines the scheduled travel region 142 of the host vehicle 100 by using the recognition result obtained by the external environment recognition unit 52 and the target trajectory 140 generated by the trajectory generation unit 56.

In step S54, on the basis of the scheduled travel region 142 determined in step S53, the influence level evaluation unit 60 determines interruption regions 144R, 144L on both sides of the scheduled travel region 142.

Figure 9:
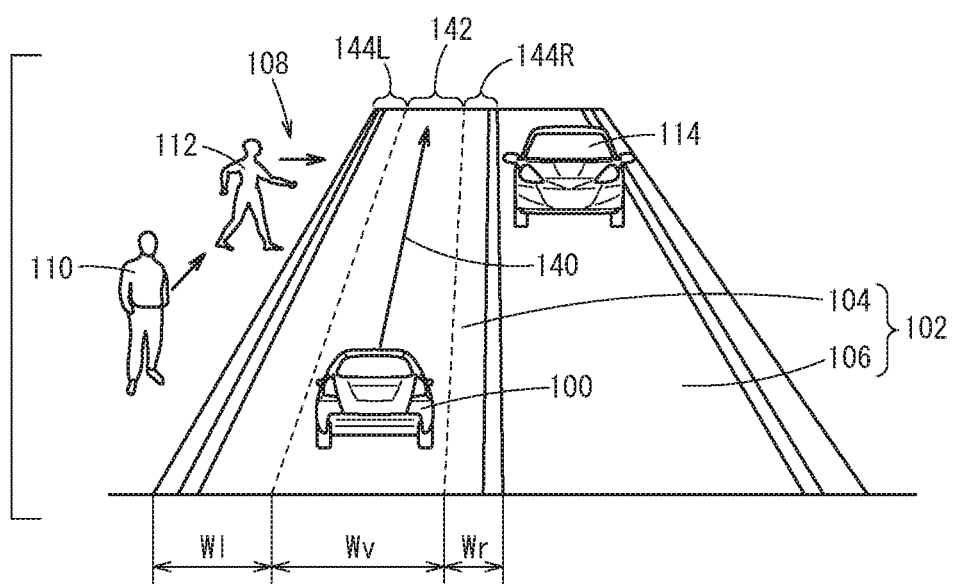
FIG. 9 expresses a positional relation among a target trajectory, a scheduled travel region, and an interruption region.

FIG. 9 depicts a positional relation among the target trajectory 140, the scheduled travel region 142, and the interruption regions 144R, 144L. The scheduled travel region 142 is a band-shaped area with the target trajectory 140 of the host vehicle 100 extending through the center, and corresponds to the trajectory of the host vehicle 100 in which a vehicle width Wv is considered. The interruption region 144R on the right is a band-shaped area with a width Wr and is in contact with a right border of the scheduled travel region 142. The interruption region 144L on the left is a band-shaped area with a width Wl and is in contact with a left border of the scheduled travel region 142.

The widths Wv, Wr, Wl may be either a fixed value or a variable value. For example, if the host vehicle 100 travels at high speed, the widths Wr, Wl may be set larger and if the host vehicle 100 travels at low speed, the widths Wr, Wl may be set smaller.

Figure 8:
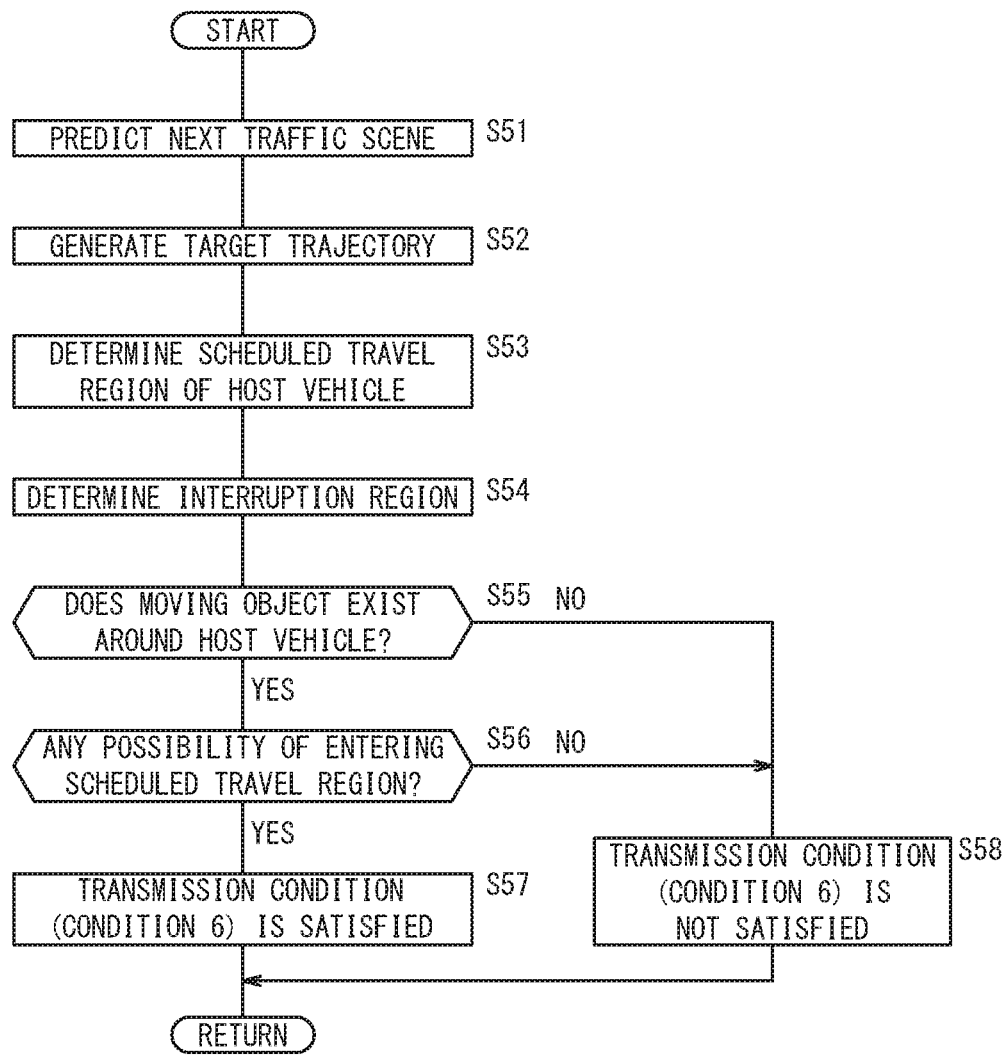
FIG. 8 is a flowchart for specifically describing a determination process (step S5 in FIG. 2)

In step S55, the influence level evaluation unit 60 determines whether there is a moving object around the host vehicle 100. If there is no moving object around the host vehicle 100 (step S55: NO), the influence level evaluation unit 60 determines that Condition 6 is not satisfied (step S58), and the flowchart in FIG. 8 is terminated.

In the example in FIG. 9, it is determined that the pedestrians 110, 112 and another vehicle 114 are detected around the host vehicle 100 (step S55: YES); therefore, the process advances to the next step S56.

In step S56, the influence level evaluation unit 60 predicts the possibility for each moving body that is known in step S55 to enter the scheduled travel region 142. Here, the moving object within the scheduled travel region 142 is determined as a moving object having entered the scheduled travel region 142, and the moving object within the interruption regions 144R, 144L is determined as a moving object predicted to enter the scheduled travel region 142. If it is predicted that the possibility to enter the scheduled travel region 142 is low in regard to all the moving bodies (step S56: NO), the influence level evaluation unit 60 determines that Condition 6 is not satisfied (step S58), and the flowchart in FIG. 8 is terminated.

On the other hand, if it is predicted that the possibility to enter the scheduled travel region 142 is high in regard to at least one moving object (step S56: YES), the influence level evaluation unit 60 determines that Condition 6 is satisfied (step S57), and the flowchart in FIG. 8 is terminated.

Thus, the communication controller 62 (condition determination unit 66) may perform the transmission control when detecting the environment state in which the moving object or the movable object has entered the scheduled travel region 142 including the target trajectory 140 or is predicted to enter the scheduled travel region 142. This makes it possible to specify the traffic scene in which, if the host vehicle 100 continues to travel further in the current travel state, the possibility of contacting with the moving object or the movable object is high. Therefore, the state information that is useful for the posterior analysis can be extracted and transmitted timely.

[Effect of Vehicle Control System 10]

As described above, the vehicle control system 10 includes: [1] the state detection unit (vehicle sensor 20, operation detection sensor 26, external environment sensor 14, or internal environment sensor 16) configured to detect at least one of the travel state of the host vehicle 100, the operation state of the operation device 24 mounted on the host vehicle 100, and the environment state around the host vehicle 100 or inside the host vehicle 100; [2] the travel controller 58 configured to perform the travel control in which at least a part of the speed control or the steering control for the host vehicle 100 is automated on the basis of the detection result from the state detection unit; and [3] the state extraction unit 64 configured to, if the state detected by the state detection unit satisfies the extraction condition while the travel controller 58 performs the travel control, extract in time series, information regarding the detected state as learning data for correcting the travel control in the travel controller 58.

The vehicle control system 10 further includes [4] the communication device 18 configured to communicate with the external device, and [5] the communication controller 62 configured to, if the transmission condition regarding the detected state is satisfied while the travel control is performed, perform the transmission control in which the state information (attentional state information 46) representing the travel state, the operation state, or the environment state is transmitted to the external device through the communication device 18.

In addition, this vehicle control method includes: the detection step of detecting at least one of the travel state of the host vehicle 100, the operation state of the operation device 24 mounted on the host vehicle 100, and the environment state around or inside the host vehicle 100; the control step of performing the travel control in which at least a part of the speed control or the steering control for the host vehicle 100 is automated on the basis of the detection result in the detection step; and the extraction step of, if the state detected in the detection step satisfies the extraction condition while the travel control is performed in the control step, extracting in time series, the information regarding the detected state as the learning data for correcting the travel control in the control step.

In addition, this vehicle control method is a method using the vehicle control system 10 including [1] the communication device 18, and [2] the state detection unit (vehicle sensor 20, operation detection sensor 26, external environment sensor 14, or internal environment sensor 16) and includes: [3] the control step (S3) of performing the travel control in which at least a part of the speed control or the steering control for the host vehicle 100 is automated on the basis of the detection result from the state detection unit; and [4] the transmission step (S8) of, if the transmission condition regarding the detected state is satisfied while the travel control is performed, transmitting the attentional state information 46.

Thus, in a case where the transmission condition regarding the detected state is satisfied while the travel controller 58 performs the travel control, the attentional state information 46 representing the travel state, the operation state, or the environment state is transmitted. Therefore, the traffic scene where the attentional level is relatively high is specified by the setting of the transmission condition and only the attentional state information 46 in such a traffic scene can be effectively extracted and transmitted. Accordingly, the communication capacity and the processing load when the information obtained from the host vehicle 100 is transmitted can be effectively reduced.

[Structure of Travel Assist Server 200]

Subsequently, description is given of the travel assist server 200 that assists the travel of the vehicle (for example, host vehicle 100, another vehicle 114 in FIG. 3) with reference to FIG. 10 to FIG. 12.

FIG. 10 is a block diagram illustrating a structure of the travel assist server 200 according to one embodiment of the present invention. The travel assist server 200 is a computer configured to accumulate the attentional state information 46 transmitted from the vehicle control system 10 in each of the host vehicle 100 and another vehicle 114. Specifically, the travel assist server 200 includes a server side communications unit 202, a server side controller 204, and a server side storage unit 206.

The server side communications unit 202 is an interface that transmits and receives an electric signal to and from an external device. This enables the server side communications unit 202 to receive the attentional state information 46 from the host vehicle 100 (another vehicle 114) and transmit the pattern information 44 to the host vehicle 100 (another vehicle 114) through a network NW.

The server side controller 204 includes a processing unit such as a central processing unit (CPU). The server side controller 204 reads out programs from a memory that is not shown, and executes the programs, so that the server side controller 204 functions as an inference engine 208, a learning processing unit 210, and a pattern transmission processing unit 212.

Here, the inference engine 208 having received an input of one or more characteristic amounts outputs a prediction result regarding the level of the influence on the travel of the vehicle in accordance with a calculation rule constructed by the learning process. The inference engine 208 is constructed on the basis of a known artificial intelligence technique including, for example, a neural network, machine learning, or deep learning. Note that a learning algorithm may employ any of supervised learning, unsupervised learning, and reinforcement learning.

The calculation rule of the inference engine 208 is determined based on values of a parameter group 218 corresponding to an aggregation of parameters. This parameter group 218 is stored in the server side storage unit 206 and read out timely, as necessary. If the inference engine 208 is constructed using a multilayered neural network, the parameter group 218 may include, for example, a coefficient that specifies a neuron response function, a coefficient that weighs synaptic connection, the number of intermediate layers, and the number of neurons in each layer.

The server side storage unit 206 includes a non-transient, computer-readable storage medium. In the server side storage unit 206, for example, two kinds of databases are constructed; specifically, a database regarding the attentional state information 46 (hereinafter, attentional state information DB 214) and a database regarding leaning data 224 (or pattern information 44) (hereinafter, leaning pattern DB 216) are constructed.

[Operation of travel assist server 200] The travel assist server 200 in the present embodiment is structured as above. Next, an operation of the travel assist server 200 (particularly, learning operation of inference engine 208) is described with reference to FIGS. 11A to 12.

<STEP 1. Collection of Attentional State Information 46>

First, the travel assist server 200 collects pieces of attentional state information 46 that are sequentially transmitted from a plurality of vehicles. Specifically, the server side controller 204 obtains the attentional state information 46 through the network NW and the server side communications unit 202 and then, updates the attentional state information DB 214 (accumulates data). As described above, the travel assist server 200 can effectively receive only the attentional state information 46 in the traffic scene where the attentional level is relatively high.

<STEP 2. Generation of Learning Data 224>

Second, the travel assist server 200 generates the learning data 224 to be used in the learning process of the inference engine 208 on the basis of the accumulated attentional state information 46. Specifically, the learning processing unit 210 generates the learning data 224 as the characteristic amount by performing a desired signal process on the attentional state information 46.

Figure 11A:
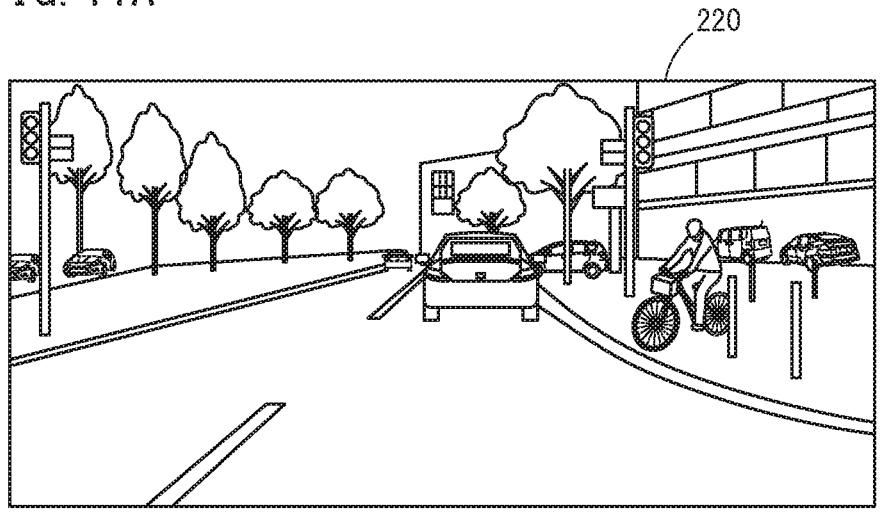
FIG. 11A is a diagram showing a captured image as one mode of attentional state information.

FIG. 11A is a captured image 220 as one mode of the attentional state information 46. The learning processing unit 210 performs known image processing including an edge extraction process and/or a labeling process to abstract a shape or a color of the captured image 220, and thus, generates an abstracted image 222 (one mode of learning data 224).

Figure 11B:
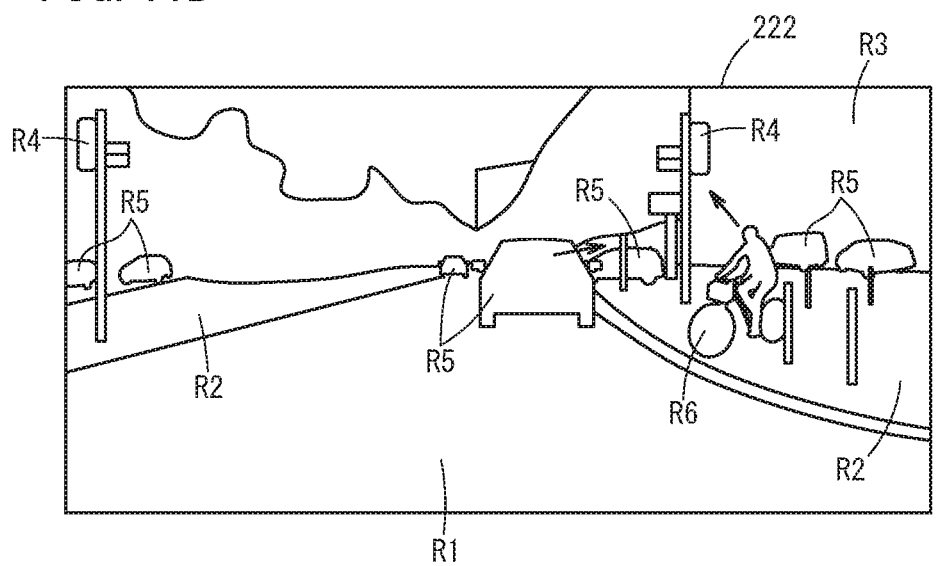
FIG. 11B is an abstracted image as one mode of learning data.

FIG. 11B is the abstracted image 222 as one mode of the learning data 224. The abstracted image 222 includes, for example, a lane region R1, a sidewalk region R2, a building region R3, and a traffic signal region R4. An image region corresponding to the moving object, specifically a vehicle region R5 and a bicycle region R6 are associated with a speed vector and a posture (direction where an occupant faces).

In this manner, the learning processing unit 210 generates the learning data 224 in which input values of the learning processes (characteristic amounts) and the pieces of attentional state information that have been classified in the past.

<STEP 3. Learning Process>

Third, the travel assist server 200 performs the learning process of the inference engine 208 by using an aggregation of the generated learning data 224 (hereinafter referred to as learning data group 226). Specifically, the learning processing unit 210 compares a correct value (ideal output value) of the learning data 224 and an actual output value of the inference engine 208, and updates each value of the parameter group 218 so that the error of the output value is reduced.

Figure 12:
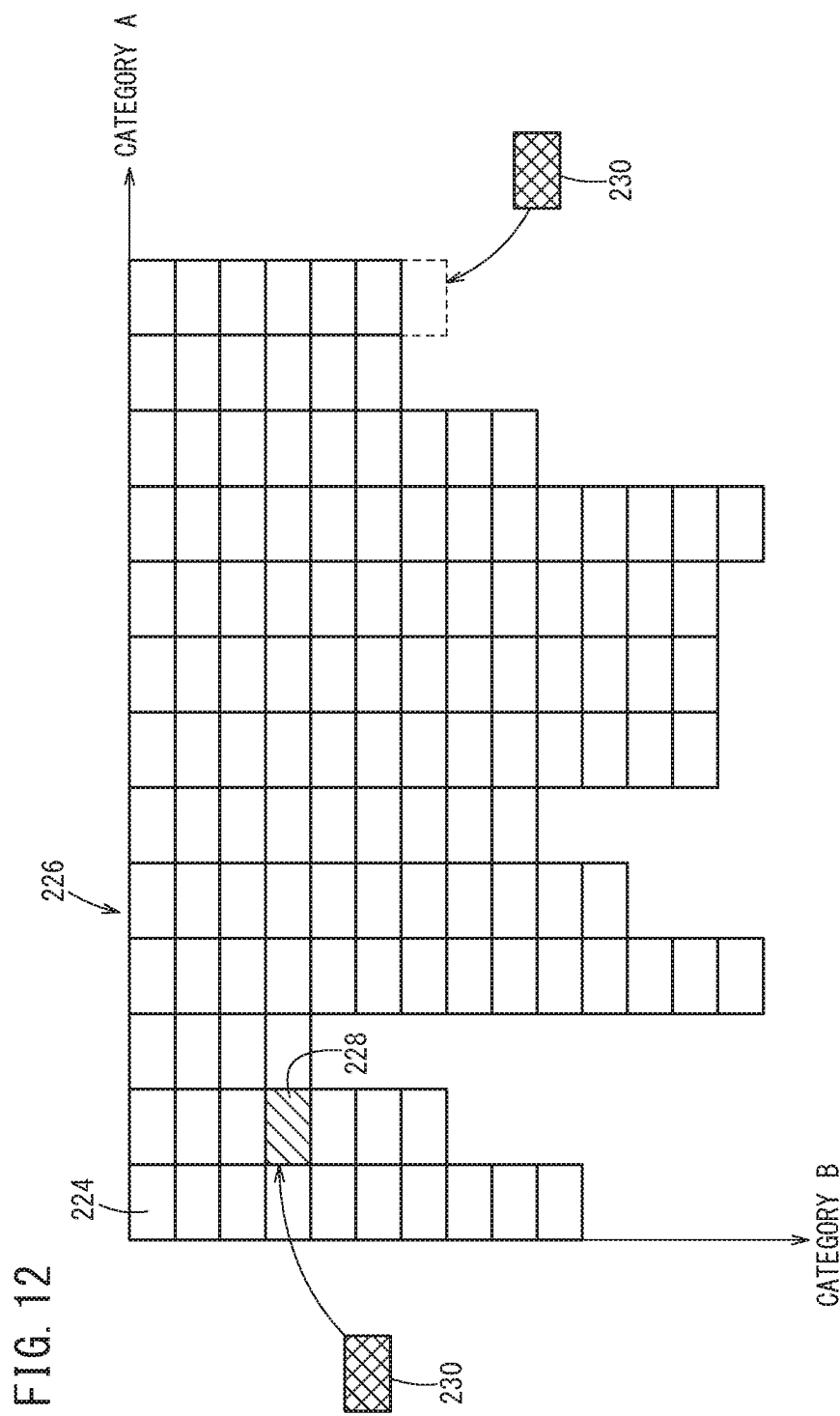
FIG. 12 is a schematic view of a learning data group that is used in a learning process.

FIG. 12 is a schematic view of the learning data group 226 that is used in the learning process. The learning data group 226 is classified multi-dimensionally in a plurality of viewpoints (in the example illustrated in FIG. 12, category A/B). Note that rectangular elements correspond to the pieces of learning data 224.

For example, if the pieces of attentional state information 46 are collected so that the learning data 224 that is preferable in the same or similar classification is obtained, replacing past learning data 228 with new learning data 230 can improve the prediction accuracy of the inference engine 208 in that classification. If the leaning data 224 that are not classified yet are obtained, adding the new learning data 230 can improve the prediction accuracy of the inference engine 208 in that classification.

<STEP 4. Provision of Pattern Information 44>

Fourth, the travel assist server 200 extracts the pattern information 44 from the learning data group 226 that is refined sequentially, and then provides the pattern information 44 to the vehicles. Specifically, the pattern transmission processing unit 212 transmits the pattern information 44 to each vehicle in accordance with a request from the vehicle. This enables the vehicle control system 10 to obtain the pattern information 44 through the server side communications unit 202, the network NW, and the communication device 18.

[Effect by Travel Assist Server 200]

As described above, the travel assist server 200 is configured to accumulate the attentional state information 46 transmitted from the vehicle control system 10. That is to say, the travel assist server 200 can effectively receive only the attentional state information 46 in the traffic scene where the attentional level is relatively high, and therefore can reduce the communication capacity and the processing load when receiving the information from the host vehicle 100.

[Supplement]

The present invention is not limited to the embodiment described above, and changes can be made freely without departing from the concept of the present invention. The structures can be combined arbitrarily in the range where technical contradictions do not occur.

For example, in the present embodiment, the vehicle control system 10 generates the action plan or the travel trajectory; however, the device structure is not limited to this example. For example, the travel assist server 200 may have the functions of the action plan creation unit 54 and the trajectory generation unit 56 (FIG. 1). In this case, the vehicle control system 10 can perform the travel control of the host vehicle 100 on the basis of the action plan or the travel trajectory that is transmitted sequentially from the travel assist server 200.

What is claimed is:

1. A vehicle control system comprising:
a processor; and
a memory that stores executable instructions that, when executed by the processor, cause performance of operations, comprising:
detecting at least one of a travel state of a host vehicle, an operation state of an operation device mounted on the host vehicle, and an environment state around the host vehicle or inside the host vehicle, resulting in a detected state;
performing a travel control in which at least a part of a speed control or a steering control for the host vehicle is automated on a basis of the detected state;
when the detected state satisfies an extraction condition while performing the travel control, extracting in time series, information regarding the detected state as learning data for correcting the travel control; and
when a transmission condition regarding the detected state is satisfied while performing the travel control:
communicating with an external device, and
performing a transmission control in which state information representing the travel state, the operation state, or the environment state is transmitted to the external device.

2. The vehicle control system according to claim 1, wherein extracting the information occurs when the detected state comprises:
the travel state or the environment state in which an object is in contact with the host vehicle;
the travel state in which the amount of braking the host vehicle is more than a predetermined value;
the operation state in which the amount of operating a brake pedal of the host vehicle is more than a predetermined value; or
the travel state in which a behavior of the host vehicle has changed to deviate from an allowable range.

3. The vehicle control system according to claim 1, wherein the extracting comprises extracting the information when the detected state comprises the operation state in which a driver of the host vehicle touches or operates the operation device regarding the steering control.

4. The vehicle control system according to claim 2, wherein the extracting comprises extracting the information at least when the operation device has deteriorated in performance or a deterioration of performance of operations occurs comprising:
the communicating with the external device,
the performing the travel control, or
the detecting the detected state.

5. The vehicle control system according to claim 1, wherein the extracting comprises extracting the information at least when the detected state comprises the environment state in which a moving object or a movable object around the host vehicle is predicted to have an influence on travel of the host vehicle.

6. The vehicle control system according to claim 5, wherein the detected state further comprises the environment state in which a level of the influence of the moving object or the movable object on the travel of the host vehicle is evaluated as being more than or equal to a threshold.

7. The vehicle control system according to claim 5, wherein the detected state further comprises the environment state that is the same as or similar to an environment state pattern as a reference target.

8. The vehicle control system according to claim 5, wherein performing the travel control comprises performing the travel control to cause the host vehicle to travel along a target trajectory, and wherein the detected state further comprises the environment state in which the moving object or the movable object has entered a scheduled travel region including the target trajectory or is predicted to enter the scheduled travel region.

9. The vehicle control system according to claim 1, wherein the detected state comprises:
   the travel state in which the amount of braking the host vehicle is more than a predetermined value; and
   the environment state in which a moving object or a movable object appears around the host vehicle.

10. The vehicle control system according to claim 2, wherein performing the transmission control comprises performing the transmission control by variably setting sampling intervals of the state information in accordance with a level of an influence of a moving object or a movable object around the host vehicle on travel of the host vehicle.

11. The vehicle control system according to claim 1, wherein the operations further comprise:
   generating a target trajectory involved in the travel control, and
   when the detected state comprises the environment state that is a same as or similar to an environment state pattern as a reference target, generate the target trajectory on a basis of the pattern.

12. The vehicle control system according to claim 11, wherein the operations further comprise:
   evaluating a level of an influence of a moving object or a movable object around the host vehicle on travel of the host vehicle, and
   generating the target trajectory in which the level of the influence is relatively low.

13. A vehicle control method comprising:
   detecting, by a vehicle control system comprising a processor, at least one of a travel state of a host vehicle, an operation state of an operation device mounted on the host vehicle, and an environment state around or inside the host vehicle;
   performing, by the vehicle control system, a travel control in which at least a part of a speed control or a steering control for the host vehicle is automated on a basis of a detection result in the detection step;
   when a state detected in the detection step satisfies an extraction condition while the travel control is performed in the control step, extracting, by the vehicle control system, in time series, information regarding the detected state as learning data for correcting the travel control in the control step; and
   when a transmission condition regarding the detected state is satisfied while performing the travel control:
      communicating, by the vehicle control system, with an external device, and
      performing, by the vehicle control system, a transmission control in which state information representing the travel state, the operation state, or the environment state is transmitted to the external device.

14. A travel assist server, comprising:
a processor; and
a memory that stores executable instructions that, when executed by the processor, cause performance of operations, comprising:
   detecting at least one of a travel state of a host vehicle, an operation state of an operation device mounted on the host vehicle, and an environment state around the host vehicle or inside the host vehicle, resulting in a detected state;
   performing a travel control in which at least a part of a speed control or a steering control for the host vehicle is automated on a basis of the detected state;
   when the detected state satisfies an extraction condition while performing the travel control, extracting in time series, information regarding the detected state as learning data for correcting the travel control; and
   if a transmission condition regarding the detected state is satisfied while performing the travel control;
   communicating, by the vehicle control system, with an external device, and
   performing a transmission control in which state information representing the travel state, the operation state, or the environment state is transmitted to the external device.

* * * * *

UNITED STATES PATENT AND TRADEMARK OFFICE
CERTIFICATE OF CORRECTION

PATENT NO. : 10,921,814 B2
APPLICATION NO. : 15/993787
DATED : February 16, 2021
INVENTOR(S) : Kawabe et al.

Page 1 of 1

It is certified that error appears in the above-identified patent and that said Letters Patent is hereby corrected as shown below:

In the Claims

In Columns 18 and 19, in Claims 4 and 10 should read:
". . . according to claim 1, . . ."

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*